APPARATUS FOR RECORDING LIGHT SPOT TRACES ON FILM

Filed April 16, 1959 3 Sheets-Sheet 1

INVENTORS
Maurice Marchal
Marie-Therese Marchal
By Holcombe, Wetherill & Brisebois
ATTORNEYS

APPARATUS FOR RECORDING LIGHT SPOT TRACES ON FILM

Filed April 16, 1959 3 Sheets-Sheet 2

INVENTORS
Maurice Marchal
Marie-Therese Marchal
By Holcombe, Wetherill & Brisebois
ATTORNEYS

APPARATUS FOR RECORDING LIGHT SPOT TRACES ON FILM

INVENTORS
Maurice Marchal
Marie-Therese Marchal
By Holcombe, Wetherill & Brisebois
ATTORNEYS 3,020,119

APPARATUS FOR RECORDING LIGHT SPOT TRACES ON FILM

Maurice Marchal and Marie-Therese Marchal, both of 12 Rue Jacques Bingen, Paris, France Filed Apr. 16, 1959, Ser. No. 806,883
Claims priority, application France Apr. 17, 1958
2 Claims. (Cl. 346—109)

Figure 1:
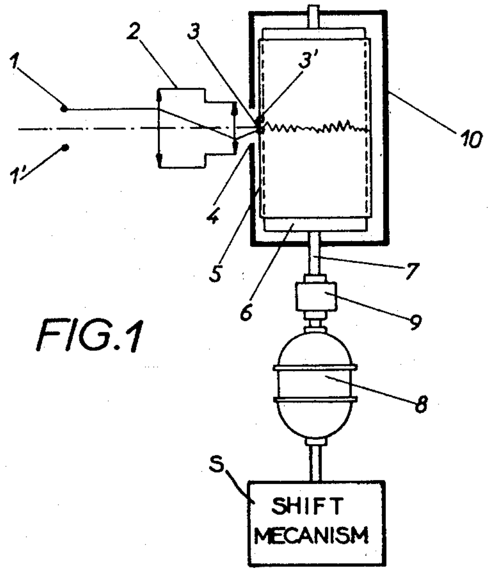

The present invention relates to apparatus for optically recording the trace of a luminous spot on sensitised film. In the industrial as well as the medical field the recordings are in general produced on a large scale which results in a large consumption of film and chemical reagents. In particular in the case of electrocardiographic applications, the actual medical technique necessitates numerous and prolonged electrocardiographic examinations very day and on a large number of patients, each of the examinations comprising at least twelve successive tests which are ordinarily recorded on a film having a standard width of 60 millimetres and moving at the speed of 2.5 centimetres per second. The film cannot be given a width less than 35 millimetres by reason of the amplitude of the undulations of the electrocardiogram, and the sensitised surface utilised cannot be reduced by reducing the speed of feeding the film since any reduction in the speed produces a congestion of the different undulations which renders the analysis difficult.

Moreover a disadvantage resides in the fact that it is not possible continuously to record very long traces during periods of several hours. For example, an uninterrupted recording for a period of one hour at the normal standard speed of 2.5 centimetres per second requires a length of 90 metres of standard film of 60 millimetres width. Thus it is usual to effect recordings of several minutes each taken at spaced intervals in time, the traces obtained thereby being discontinuous. It is thus impossible to detect transitory pathological undulations which are produced during the periods of non-recording, and which, therefore, pass completely unnoticed.

The present invention overcomes these disadvantages and has for its object to provide a device for optically recording on sensitized film which is usable in numerous applications, and particularly for recording electrocardiograms.

It consists essentially in forming on the film a spot of very small dimensions and in reducing the displacements of the spot, while reducing the speed of unwinding of the film, means being provided moreover in order that the recording covers almost the totality of the surface of the sensitized film.

The invention also provides an arrangement which enables these results to be obtained and which comprises a rectilinear light source, such as an illuminated slit, and a galvanometer (associated or not with an optical system) producing a linear image of the source on a slit which is not parallel to the said rectilinear image of the source, an optical system disposed either in front of or behind the slit and producing on the film a reduced image of the intersection of the rectilinear image of the source and of the slit as well as its displacements, and means for displacing the film in a manner such that the recording finally covers the greatest possible surface of the film.

In order to record several phenomena simultaneously, several galvanometers can be used which produce, from the source, several rectilinear images which produce on the film the same number of images which are displaced one with respect to the other.

As can be seen, the invention consists essentially in reducing by optical means, the dimensions of the luminous spot or spots translating the phenomenon or phenomena to be recorded in simultaneously reducing and in a proportional manner the speed of unwinding of the sensitive film, and in producing a displacement of the film in a manner to obtain the true microfilm to standard format (35 millimetres wide), the whole of the surface of this film being occupied by one or several traces of a single phenomenon or of several different phenomena.

After recording and developing, the microfilm can be examined by the usual methods, preferably by using an enlarged projection while causing the film to move at the desired speed.

By means of the invention it is possible to obtain on a 35 millimetre film a number of traces varying from 10 to 12. For an observation having a duration of one hour and with the speed of feeding being reduced to a quarter of a millimetre per second, a film length of 90 centimetres is sufficient.

Such a device has great advantages, in particular for recording electrocardiograms. Amongst these advantages the following can be mentioned:

A large reduction in the price of the recording.

Greatly reduced size of film which enables easy classification of medical records.

Reduction of manual labour and of the chemical reagents used.

Possibility of recording very long traces lasting several hours in a continuous manner, which enables observations of all the transitory pathological undulations which pass unnoticed with conventional apparatus.

According to one embodiment of the invention, the rectilinear image of the source and the slit are perpendicular to one another, and the displacement of the image of the source takes place in the direction of the slit whilst the displacement of the film takes place in a direction perpendicular to the slit. The spot which exposes the film is constituted by the intersection of the slit and the rectilinear image of the source.

If it be desired that the displacements of the spot be slight, either the displacement of the image of the source can be considerably reduced (which can be achieved practically by diminishing the sensitivity of the galvanometer) or use can be made of an objective with a very strong reduction power. In the first case one can be embarrassed by the recording of purely mechanical defects of the measuring apparatus, and in the second case, if it be desired to produce on the film an image which is free from aberration, it is necessary to use a large and costly optical system, especially if several recordings are to be made simultaneously.

A feature of the invention consists in a modification, which will be described hereinafter in greater detail, according to which the rectilinear image of the source forms an angle greater than 45°, and preferably about 90°, with the slit, the displacement of the rectilinear image of the source and the displacement of the film then being effected, the one and other, in a direction perpendicular to the slit. This arrangement moreover has the advantage of enabling the amplitude of the recording to be controlled, all things being otherwise equal, by varying the inclination of the image of the source with reference to the slit.

Figure 2:
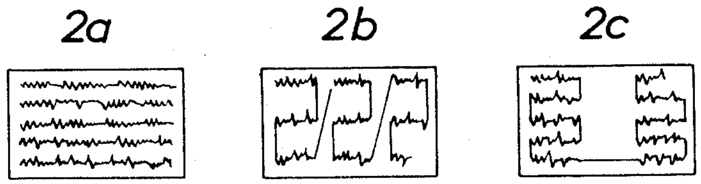
Figure 3:
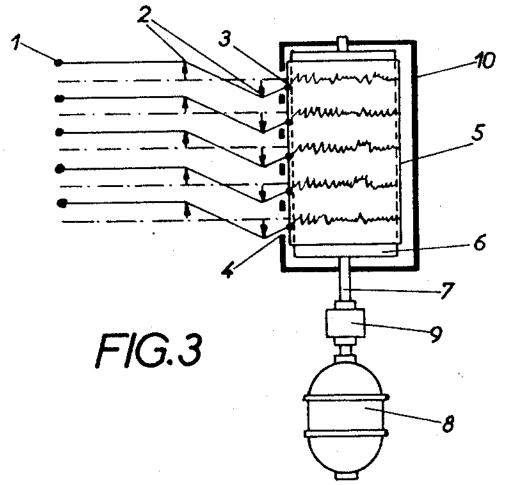
Figure 4:
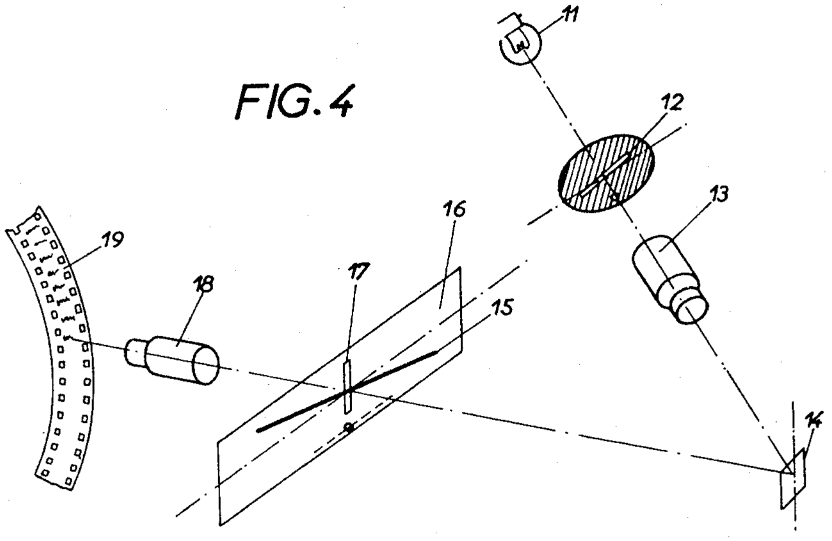
Figure 5:
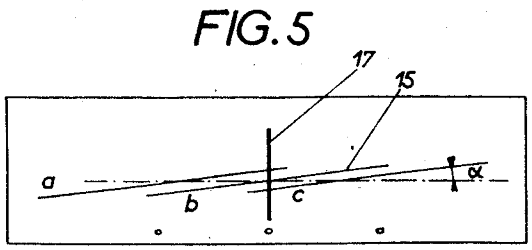

In order that the invention may be more clearly understood, reference will now be made to the accompanying drawings in which:

FIGURE 1 is a schematic view which shows how the apparatus functions,

FIGURES 2*a*, 2*b* and 2*c* show three different recordings, and show three methods of utilising the surface of a film to the best advantage, FIGURE 3 is an explanatory view similar to that of FIGURE 1, but referring to the case where five different recordings are simultaneously made, FIGURE 4 shows a modification in which a particular disposition of the slit and of the rectilinear image of the source enables the adjustment, at will, of the amplitude of the recording, FIGURE 5 is a front view of the member of FIGURE 4 having the slit, and also shows three positions of the image of the source.

Figure 8:
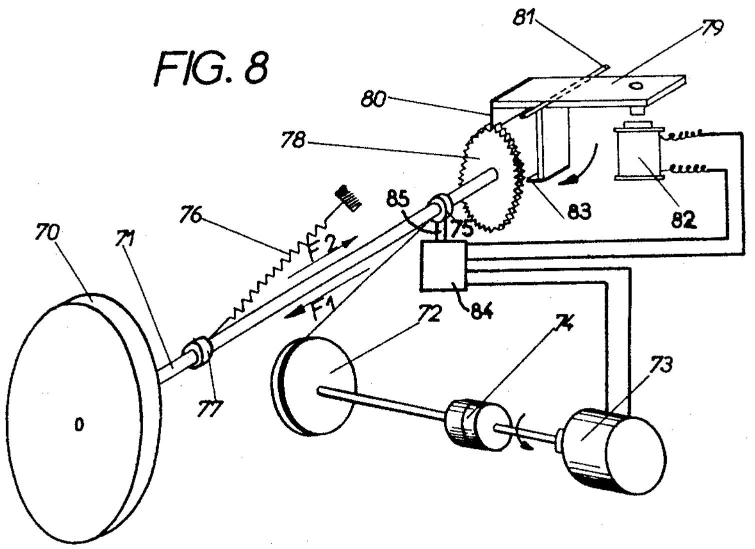
Figure 6:
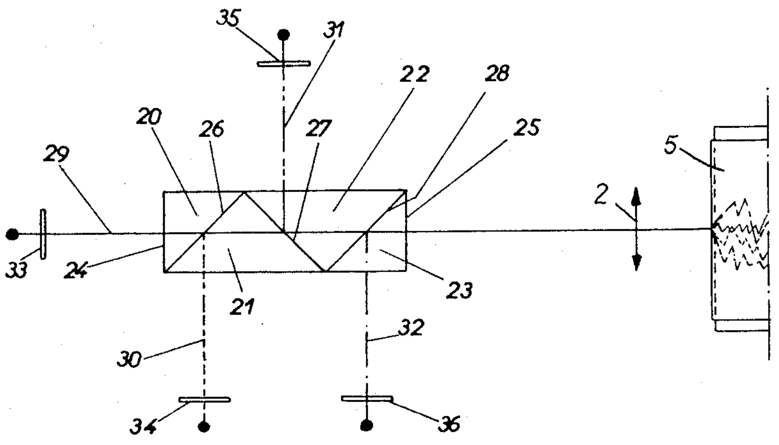
Figure 7:
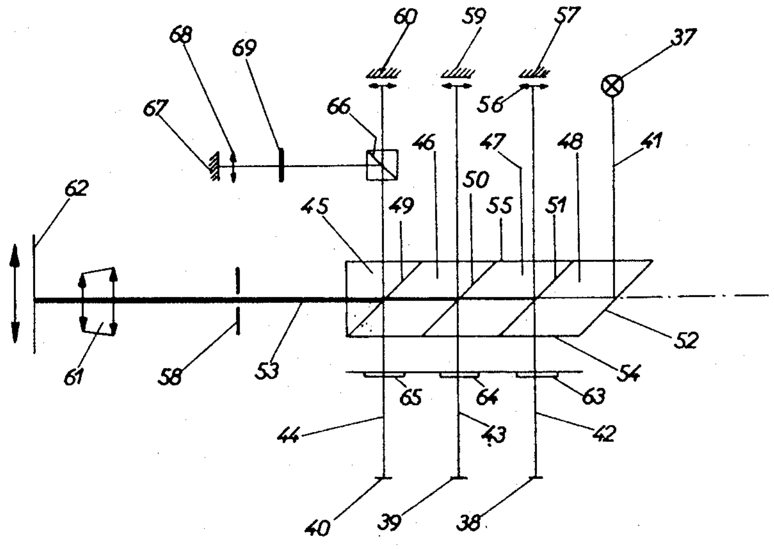

FIGURES 6 and 7 show how, with a single objective, it is possible to make several recordings in different colors along the same axis, and FIGURE 8 is a detail view of an arrangement for controlling the movement of the film.

FIGURE 1 does not show the rectilinear light source, which extends perpendicular to the plane of the figure, nor the measuring apparatus of which the movable member produces an image 1 of the source. This image 1 is a straight line extending perpendicular to the plane of the figure, and an optical system or objective 2 produces from this image another image 3, also constituted by a small straight line perpendicular to the plane of the figure. The image 3 is produced in the plane, or substantially in the plane, of a slit 4 disposed in the plane of the figure and very close to the surface of the film 5 on which the recording is to be effected. This film is wound on a drum 6 which rotates about the shaft 7 which is driven by a motor 8 through any appropriate device 9 for reducing the speed of the shaft 7 to the desired value. The assembly comprising the cylinder and the film is enclosed in a light-tight box 10.

This simplified diagram enables the operation of the device to be understood. When the image 1 is displaced by the distance $d$ from the position $l$ to the position $l'$, the image 3 is displaced by a distance $d'$ from the position 3 to the position 3'. The optical system 2 is such that $d'$ is very much less than $d$. The intersection between the image 3 and the slit 4 forms a very fine luminous spot which is also displaced by the distance $d'$. Recording takes place on the film 5 following on the rotation of the drum 6.

In order to utilise the whole surface of the film, the drum can be displaced with a helicoidal movement. Well-known means represented by the shift mechanism S can be used to obtain this result. There is then produced a recording similar to that shown in FIGURE 2*a*. The drum can also at desired moments be given sudden displacements along its axis accompanied, if desired, with a reversal of the direction of rotation. Such movements can be obtained, for example, by means of cams again represented by the shift mechanism S which in this case can be constructed in a manner similar to the mechanism disclosed in U.S. specification No. 1,812,083. The rotation is effected at a constant speed for several centimetres without translation, then the cylinder moves up rapidly and turns backwards. Thus a part of the surface of the film is covered. Arriving at the top of its ascending movement, the drum drops and then recommences its turning and lifting movements. There is then obtained recordings which can have the appearance of those shown in FIGURES 2*b* and 2*c*. These two modes of recording are interesting in many cases, for they enable a complete recording to be produced on a fragment of film. In particular, if the invention is used for medical applications such as electrocardiography, a half-hour's recording can easily be filed away in the patient's file.

FIGURE 3 concerns the case where recordings of several different measuring apparatus are produced simultaneously. An examination of the drawing easily enables the functioning of the device to be understood. In this case it is preferable to associate with each slit a separate optical system, the coefficient of reduction of which can differ according to the nature of the recording to be made, for example, for simultaneous cardiographic recordings can be made relating to several patients or, on the contrary, several recordings of a different nature concerning the same patient.

If the recordings are numerous or of long duration, several independent cylinders can be used.

Other means may also be used for the simultaneous recording of several curves, and particularly those which will be described hereinafter which produce curves having the same axis for their abscissae and which are differentiated by colour.

FIGURE 4 relates to a modification which incorporates an important feature of the present invention.

In the embodiment which has just been described, the amplitude of the recorded curve is equal to the displacement of the image 3 in the plane of the slit. If it be desired to record on microfilm, it is necessary that this displacement be very small, which necessitates a small displacement of the image 1 or a large reduction of this displacement. This presents disadvantages which have been mentioned above. In order to overcome these the arrangement shown in FIGURE 4 can be used.

A light source 11 illuminates a slit 12 which serves as the linear light source proper. The rays issuing from this source pass through an optical system 13 and are reflected by the mirror 14 of the measuring apparatus. The optical system 13 and the mirror 14 form an image 15 of the slit 12 in the plane of the member 16. This member contains a slit 17, and the light spot which is to be used to record the displacements is produced by the intersection of the image 15 and the slit 17.

An objective 18 produces on the film 19 a reduced image of the displacements of the spot. A feature of the invention resides in the fact that the rectilinear image 15 makes an angle different from 90° with the slit 17, and that the rotation of the mirror 14 is such that the image 15 is displaced in a direction perpendicular to the slit 17.

In FIGURE 5 there is shown, on an enlarged scale, three successive positions $a$, $b$ and $c$ of the image 15. It will be seen that for a large displacement (that is to say for a large rotation of the mirror of the measuring apparatus) which has shifted the image 15 from the position $a$ to the position $c$, the spot has only been displaced through a very small distance.

If $\alpha$ is the angle between the direction of the image 15 and the perpendicular to the slit 17, it will be seen that for a displacement L of the image, the displacement of the spot is $L \tan \alpha$. This shows, at the same time, that the ratio between the displacements of the spot and the image 15 can be adjusted at will. It suffices to vary the angle $\alpha$. For this purpose the slit 12 is turned in its own plane.

If $\alpha > 45°$, the displacement of the spot is greater than the displacement of the image 15. Such an adjustment is not of interest in the apparatus herein described, but it could be useful in other cases. If $\alpha = 45°$, the displacements are equal, but if $\alpha$ is in the region of 0° the displacement of the spot is very small. It is advantageous to use an objective 18 in order to obtain an image of the spot which is as point-like as possible but it suffices for this to use an ordinary objective of good quality.

The use of rectilinear sources which are inclined with reference to the slit enables, as in the case of line sources perpendicular to the slit, to make several recordings simultaneously. The arrangement shown in FIGURE 3 can be used, but it is often more convenient to use an arrangement which only needs a single objective. Only two embodiments are shown in FIGURES 6 and 7.

FIGURE 6 shows an arrangement for the simultaneous recording of four curves. This arrangement comprises four prisms 20, 21, 22 and 23 which abut together. The outer faces 24 and 25 are parallel. The faces 26, 27 and 28 are inclined at 45° to the optical axis of the projection objective 2. The mean axes of the light beams coming from the measuring apparatus have the directions 29, 30, 31 and 32 respectively. The beam 29 travels without deviation along the axis of the device. The beam 30 is totally reflected at the face 26 and then travels along the axis. The beams 31 and 32 are totally reflected at the faces 27 and 28 respectively and then travel along the axis. All the beams enter the objective 2 and the four light spots corresponding to the four beams impinge on the surface of the film 5, each spot tracing its own curve. In order to be able to differentiate the curves from each other, the most simple method consists in interposing a color filter in the path of each of the beams. These filters 33, 34, 35 and 36 are chosen in different colors so that, on a color-sensitive film, curves each having a particular color will be traced.

By multiplying the number of prisms, the arrangement can be adapted for recording any desired number of curves.

The arrangement shown in FIGURE 7 achieves the same end, but its construction and operation are slightly different. The light sources comprise a source 37 serving, for example, for indicating time, and the light slits 38, 39 and 40 disposed at a very small angle with the plane of the figure. The mean axes of the emitted beams have the directions 41, 42, 43 and 44 respectively. These beams fall on an optical assembly comprising a prism 45 and three parallelepipeds 46, 47 and 48, the faces 49, 50, 51 and 52 being inclined at 45° to the optical axis 53 of the system. The face 52 is reflecting; the beam 41 is thus reflected in the direction 53 of the optical axis of the system. The beam emitted from the slit 38 enters the system through the face 54 traverses the face 51 which is semi-transparent, passes out through the face 55, passes through an objective 56 and is then reflected in the mirror 57 of the measuring apparatus. The axis of rotation of the mirror 57 is perpendicular to the plane of the figure, the reflected beam again meets the semi-reflecting face 51 and a part is reflected along the optical axis 53 of the system. The slit 58 is perpendicular to the plane of the figure and the objective 56 is adjusted in a manner to form an image of the line source 38 in the plane of the slit 58.

Similar paths are followed by the light beams emitted by the line sources constituted by the light slits 39 and 40. It will be seen that the rays coming from the source 37 and reflected by the mirrors 57, 59 and 60 travel along the axis 53 and form a series of rectilinear images in the plane of the slit 58, each image being displaced according to its own movement. The corresponding light spots are formed by the intersections of these line images with the slit 58. An objective 61 produces reduced images of these spots and of their displacements on the film 62. The film is perpendicular to the plane of the figure and moves in the direction of the arrows. In order to be able to separate the traces of the spots from each other, it suffices to interpose color-filters 63, 64, 65 in the paths of the light beams respectively. By using a color film easily discernible traces are obtained.

The number of curves recorded can obviously be increased by adding further parallelepipeds. A cube 66 can also be interposed in such manner that its diagonal reflecting surface receives the rays coming from the mirror 67 of a galvanometer, a lens 68 forming the image of the light slit 40 on the slit 58, and a color filter 69 being interposed in the light path.

In FIGURE 8 is shown a detail of the mechanism which can be used for advancing the film. This mechanism, which is very simple and very robust, comprises a drum 70 on which is wound the film. This drum is fixed on the shaft 71 which can be displaced along its own axis. To effect this movement there is provided a pulley 72 which is driven by a motor 73 through a coupling 74. Around the pulley 72 runs a wire, the other extremity of which is fixed to the shaft 71 by a collar 75. Rotation of the motor produces a displacement of the shaft 71 in the direction of the arrow F1, whilst a restoring spring 76 fixed to a collar 77 restores the movable elements in the direction of the arrow F2. To the extremity of the shaft remote from the drum 70 is fixed to toothed wheel 78.

An escapement 79 comprising a knee piece or blade 80 of which the edge is parallel to the shaft 71 engages with the toothed wheel during the displacement of the shaft 71 in the direction of the arrow F1. The escapement 79 can oscillate about an axle 81, parallel to the shaft 71, when an electro-magnet 82 is energised. A blade 83 then comes into engagement with the toothed wheel 78. The edge of this blade, according to a feature of the invention, is not parallel to the shaft 71 but inclined with reference to this shaft. The operation of this device is then as follows.

Upon the members 70, 71 and 78 being moved by the pulley 72, into the position shown in the drawing, the motor 73 is stopped and the electro-magnet 82 is energised, by means of the switch mechanism 84 operated by actuator 85 connected to collar 75. Thereupon the edge of the blade 83 engages with the toothed wheel and the restoring spring 76 pulls the members back in the direction of the arrow F2, whereby a tooth of the wheel 78 follows the edge of the blade 83. This edge, being inclined, causes the wheel 78 to rotate about its axis. The inclination is calculated in a manner so as to produce a rotation of drum 70 through an angle equal to the angle subtended by two adjacent teeth at the center of wheel 78. When the wheel 78 arrives at the end of its travel actuator 85 again operates switch mechanism 84 and the electro-magnet 82 is de-energised and the edge of the blade 80 engages in the following tooth. The film drum 70 is thus turned through one notch. The motor 73 is started and displaces the drum parallel to the shaft 71 in the direction F1 by the desired distance in order that the light spot will traverse the width of the film. When the position shown in the figure is again reached, the cycle recommences. There is thus obtained on the film a recording composed of fragments situated one beneath the other.

The device forming the object of the invention has been described in detail in the particular case of electrocardiography but it is evident that it can have multiple applications, for example in industry, in the study of natural phenomena such as meterological phenomena, and in a general way wherever it is desired to produce a recording of long duration in a small space.

We claim:

1. Apparatus for optically recording light traces upon a film, comprising a rectilinear source of light, a member having a narrow slit, a first objective for focussing an image of said light source on to said slit with the linear direction of said image inclined at an angle of less than 45° with the perpendicular to the longitudinal direction of said slit, means for deflecting said image in the direction of said perpendicular, a measuring device connected to actuate said deflecting means, a light-sensitive film mounted behind said slit, with the length of the film extending in the direction of the slit, a second objective for focussing a reduced image of the light spot formed by the intersection of said linear image with said slit upon the film, means for moving said film transversely in the direction of said perpendicular to the longitudinal direction of said slit and at a substantially constant speed, and means for advancing said film in the longitudinal direction of said slit.

2. Apparatus as claimed in claim 1, wherein the means for moving the film comprises a drum mounted on a shaft which is mounted for movement both rotationally and in the longitudinal direction of said shaft, a toothed wheel on said shaft associated with a rocking escapement having two blades which can be alternately moved into engagement with the teeth of said toothed wheel by rocking the escapement about an axis substantially parallel to the axis of said shaft, said two blades having elongated edges one of which extends substantially parallel to the axis of said shaft and the other is inclined to said axis, an electromagnet for actuating said escapement, motor means for moving said shaft in one longitudinal direction and a spring for moving the shaft in the other longitudinal direction, and means for actuating said motor means and said electromagnet in timed relation whereby one blade of the escapement is in engagement with the toothed wheel during movement of the shaft in one direction and the other blade is in engagement with the toothed wheel during movement of the shaft in the other direction.

References Cited in the file of this patent

UNITED STATES PATENTS

| | | |
|---|---|---|
| 1,812,083 | Damerell | June 30, 1931 |
| 1,871,380 | Legg | Aug. 9, 1932 |
| 2,064,790 | Carbonara | Dec. 8, 1936 |
| 2,189,583 | Hollmann | Feb. 6, 1940 |
| 2,366,194 | Kaiser | Jan. 2, 1945 |
| 2,464,209 | Brown | Mar. 15, 1949 |
| 2,514,578 | Heller et al. | July 11, 1950 |
| 2,615,778 | Butz | Oct. 28, 1952 |
| 2,672,786 | Capstaff | Mar. 23, 1956 |
| 2,747,460 | Calvi | May 29, 1956 |

FOREIGN PATENTS

| | | |
|---|---|---|
| 520,693 | Great Britain | May 1, 1940 |